(12) United States Patent
Wachi et al.

(10) Patent No.: US 6,499,474 B2
(45) Date of Patent: Dec. 31, 2002

(54) AIR/FUEL RATIO CONTROL APPARATUS FOR INTERNAL COMBUSTION ENGINE

(75) Inventors: Satoshi Wachi, Tokyo (JP); Hideaki Katashiba, Tokyo (JP); Li Liu, Hyogo-ken (JP); Hiromichi Hisato, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/900,134

(22) Filed: Jul. 9, 2001

(65) Prior Publication Data

US 2002/0088446 A1 Jul. 11, 2002

(30) Foreign Application Priority Data

Jan. 9, 2001 (JP) ......................................... 2001-001638

(51) Int. Cl.[7] ............................................... F02D 41/30
(52) U.S. Cl. ..................... 123/673; 123/704; 123/443
(58) Field of Search ................... 123/673, 704, 123/443, 472, 478, 691, 692; 701/103, 104, 115

(56) References Cited

U.S. PATENT DOCUMENTS 5,448,978 A * 9/1995 Hasegawa et al. .......... 123/478

FOREIGN PATENT DOCUMENTS

| JP | 59-3129 | 1/1984 | |
|---|---|---|---|
| JP | 202650 | * 9/1991 | ........... F02D/41/14 |
| JP | 5-180040 | 7/1993 | |
| JP | 5-180059 | 7/1993 | |
| JP | 228869 | * 9/1997 | ........... F02D/41/06 |

* cited by examiner

Primary Examiner—Tony M. Argenbright
Assistant Examiner—Hai Huynh
(74) Attorney, Agent, or Firm—Sughrue Mion, PLLC

(57) ABSTRACT

An air/fuel ratio correction cylinder determining section 25 specifies, based on the peak phase, a cylinder for which an air/fuel ratio is to be corrected. A cylinder-specific air/fuel ratio correcting section in the form of respective cylinder correcting sections 31 through 34 corrects an amount of fuel to be supplied to a cylinder which becomes an air/fuel ratio correction target. A cylinder for which an air/fuel ratio deviates from the remaining cylinders is specified as a fuel amount correction target based on a change in the output value of the air/fuel ratio sensor.

10 Claims, 11 Drawing Sheets

AIR/FUEL RATIO CONTROL APPARATUS FOR INTERNAL COMBUSTION ENGINE

This application is based on Application No. 2001-001638, filed in Japan on Jan. 9, 2001, the contents of which are hereby incorporated by reference.

BACKGROUND OF THE INVENTION

1. Field of the Invention

The present invention relates to an air/fuel ratio control apparatus for an internal combustion engine which can detect the air/fuel ratio of a mixture in each cylinder based on the output of an air/fuel ratio sensor installed on a collective portion of an exhaust system at which exhaust gases from a plurality of cylinders are merged with each other, and uniformly control the air/fuel ratios of all the cylinders to a target value, and in particular, it concerns with such an air/fuel ratio control apparatus for an internal combustion engine which is improved in the reliability in control by the use of relatively easy determination processing.

2. Description of the Related Art

In general, with an air/fuel ratio control apparatus for an internal combustion engine (hereinafter simply referred to as an engine), there has been known a method for controlling an air/fuel ratio of an air fuel mixture supplied to each cylinder of the engine in the following manner. That is, an air/fuel ratio sensor is installed on a collective portion of an exhaust system of the engine, and the control apparatus operates to take in an output (i.e., air/fuel ratio signal) of the air/fuel ratio sensor in synchronization with the timing at which exhaust gases from respective cylinders of the engine pass through the exhaust system collective portion, and correct the amounts of fuel to be injected into the respective cylinders in response to the air/fuel ratio signal from the air/fuel ratio sensor thereby to uniformly control the air/fuel ratios of the air fuel mixture supplied to the respective cylinders.

At this time, it is required to accurately detect the air/fuel ratio of an exhaust gas corresponding to each cylinder, but it is known that in actuality, the exhaust gases from a plurality of cylinders in a state of being mixed with one another pass through the exhaust system collective portion (i.e., air/fuel ratio sensor), so the air/fuel ratio detection information obtained from the air/fuel ratio sensor includes the influence of the air/fuel ratios in the respective cylinders, and hence it is difficult to accurately detect the air/fuel ratio in each cylinder.

In addition, since the extent of the influences of other cylinders on the detected value of the air/fuel ratio of a specific cylinder varies according to the engine operating state (e.g., the number of revolutions per unit time of the engine, the amount of intake air, etc.), it is even more difficult to accurately detect the air/fuel ratio corresponding to the specific cylinder.

Moreover, since the air/fuel ratio sensor has a time lag (i.e., so-called response delay) from the time when an exhaust gas has actually arrived there to the time when the air/fuel ratio of the exhaust gas detected by the sensor appears as a detection value, it is necessary to take such a response delay into consideration and thus it becomes very difficult to detect the air/fuel ratio corresponding to each cylinder in a reliable manner.

Therefore, it is difficult for the conventional apparatus to accurately detect the air/fuel ratio corresponding to a specific cylinder, thus making it impossible to achieve a high degree of air/fuel ratio control accuracy to any satisfactory extent.

To cope with such a problem, apparatuses were proposed in the past in Japanese patent Nos. 2689362 and 2717744, for example.

In the apparatuses described in the above-mentioned patents, there is constructed a mathematical model representing the behaviors of component elements such as the flow of exhaust gases to an exhaust system, an output response delay of an air/fuel ratio sensor, etc., based on which an observer is designed to estimate an air/fuel ratio in each cylinder, whereby the air/fuel ratios in the respective cylinders are made uniform.

In the case of using such a mathematical model, however, the arithmetic operations in a central processing unit (CPU) become complicated, resulting in an increased processing time and an increased software load. Moreover, since the behaviors of respective component elements of the apparatus are expressed by the mathematical expressions, the results of estimation carried out by the use of the mathematical model are liable to various influences such as a change in the operating state of the engine, variations in the manufacture of component elements, etc., and hence it is impossible to obtain a satisfactorily high degree of control accuracy.

On the other hand, it was also proposed that as disclosed in Japanese Patent Publication No. 4-8616 for instance, the output value of an air/fuel ratio sensor and the air/fuel ratios of respective cylinders can be correlated with each other easily by limiting the requirements for detecting the air/fuel ratios to an idling state of the engine alone, thereby achieving uniform control on the air/fuel ratios in the respective cylinders.

However, in the idling state of the engine, the combustion state is unstable so the engine rotation is liable to undergo great fluctuations, as a consequence of which there are a lot of factors deteriorating the accuracy in the detection of the air/fuel ratios, and there is a decreased amount of exhaust gases in that engine operation range, thus further worsening the response of the air/fuel ratio sensor.

Therefore, even if the air/fuel ratio is detected in the idling state, the width or magnitude of variations in the sensor output will become small and hence it is difficult to accurately detect the information on an air/fuel ratio corresponding to each cylinder after all.

FIG. 14 is an explanatory view illustrating a correction target cylinder determining operation performed by a conventional apparatus which adopts a method of detecting air/fuel ratios at respective prescribed crank angles, in which the abscissa represents reference crank angle positions (TDC) corresponding to the respective cylinders (#1 through #4), and the ordinate represents a change in the output value of an air/fuel ratio sensor (air/fuel ratio A/F).

In FIG. 14, arrows of broken lines indicate the air/fuel ratio detection timing of the respective cylinders, and the output value (A/F) of the air/fuel ratio sensor is read at the respective prescribed crank angles.

Herein is shown the case where the air/fuel ratio in the cylinder #3 is shifted or deviated to a rich air/fuel ratio side (hereinafter simply referred to as a rich side) as compared with those in the remaining cylinders.

According to such a method of detecting at the respective prescribed crank angles, there might be a fear that though the cylinder #3 is to be determined as a cylinder corresponding to a rich side peak phase, the cylinder #4 is mistakenly determined as a correction target cylinder, for example, in the case where the air/fuel ratio of the cylinder #4 is shifted or deviated to the rich side more than that of the cylinder #3, as indicated by solid line arrows.

In the conventional air/fuel ratio control apparatus for an internal combustion engine as described above, in the case where a variety of behavior factors are taken into a mathematical model, the load on software increases, and the apparatus is subject to influences such as a change in the engine operating state, variations in the manufacture of component parts, etc., which are difficult to represent by means of mathematical expressions, thus making it impossible to achieve sufficient reliability.

Moreover, when the air/fuel ratio detection condition is limited to an idling state of an engine, there arise the following problems: namely, in the idling state in which the combustion state of the engine is unstable and the amount of exhaust gases is limited, the rotational speed of the engine varies greatly, thus deteriorating the detection accuracy, and the variable range of the air/fuel ratio sensor output is small, as a consequence of which it is difficult to accurately detect the information on the air/fuel ratios corresponding to the respective cylinders.

SUMMARY OF THE INVENTION

The present invention is intended to obviate the problems as referred to above, and has its object to provide an air/fuel ratio control apparatus for an internal combustion engine which is capable of making the air/fuel ratios of respective cylinders uniform with high accuracy without causing an increase in the load of arithmetic operations of a CPU, and without being subject to the influence of a change in the engine operating state, etc., by specifying as a fuel amount correction target a cylinder for which the air/fuel ratio deviates from those of the remaining cylinders, based on a variation in the output value of the air/fuel ratio sensor.

Bearing the above object in mind, according to the present invention, there is provided an air/fuel ratio control apparatus for an internal combustion engine, comprising: fuel injectors respectively provided on a plurality of cylinders; an air/fuel ratio sensor disposed at a collective portion of an exhaust system at which exhaust gases from the respective cylinders are collected; a crank angle sensor for detecting a crank angle phase of each of the cylinders; an air/fuel ratio detection period setting section for setting an air/fuel ratio detection period in which exhaust strokes of all cylinders are included; a peak phase detecting section for taking in an output of the air/fuel ratio sensor during the air/fuel ratio detection period and detecting peak phases which become a maximum on a rich side or on a lean side due to variations in the air/fuel ratio; an air/fuel ratio correction cylinder determining section for specifying, based on the peak phases, an air/fuel ratio correction target cylinder for which an air/fuel ratio is to be corrected; and a cylinder-specific air/fuel ratio correcting section for correcting an amount of fuel to be supplied to the air/fuel ratio correction target cylinder. The amounts of fuel to be supplied to the respective cylinders are made uniform by means of the cylinder-specific air/fuel ratio correcting section.

In a preferred form of the present invention, the cylinder-specific air/fuel ratio correcting section corrects an amount of fuel to be supplied to the air/fuel ratio correction target cylinder in a decreasing direction when the air/fuel ratio correction target cylinder corresponds to a rich side peak phase, but in an increasing direction when the air/fuel ratio correction target cylinder corresponds to a lean side peak phase.

In another preferred form of the present invention, the peak phase detecting section detects a rich side peak phase alone, and the air/fuel ratio correction cylinder determining section specifies, based on the rich side peak phase, only that cylinder for which an output value of the air/fuel ratio sensor is assumed to deviate from those for the remaining cylinders, as the air/fuel ratio correction target cylinder.

In a further preferred form of the present invention, the peak phase detecting section detects a lean side peak phase alone, and the air/fuel ratio correction cylinder determining section specifies, based on the lean side peak phase, only that cylinder for which an output value of the air/fuel ratio sensor is assumed to deviate from those for the remaining cylinders, as the air/fuel ratio correction target cylinder.

In a yet further preferred form of the present invention, the peak phase detecting section detects a rich side peak phase and a lean side peak phase, and when it is determined that a first cylinder and a second cylinder correspond to the rich side peak phase and the lean side peak phase, respectively, and when the order of respective exhaust strokes of the first and second cylinders is consecutive, the air/fuel ratio correction cylinder determining section specifies only one of the first and second cylinders, of which the exhaust stroke is later than that of the other cylinder, as the air/fuel ratio correction target cylinder.

In a still further preferred form of the present invention, when it is determined that a first cylinder and a second cylinder correspond to the rich side peak phase and the lean side peak phase, respectively, and when the order of respective exhaust strokes of the first and second cylinders is not consecutive, the air/fuel ratio correction cylinder determining section specifies the first and second cylinders as the air/fuel ratio correction target cylinders, for which the air/fuel ratios deviate to the rich side and the lean side, respectively.

In a further preferred form of the present invention, when it is determined that a first group of cylinders and a second group of cylinders correspond to the rich side peak phase and the lean side peak phase, respectively, and when the first group of cylinders including one half of a total number of all the cylinders and the second group of cylinders including the other half of all the cylinders are detected alternately, the air/fuel ratio correction cylinder determining section specifies either one of the first and second groups of cylinders as the air/fuel ratio correction target cylinders.

In a further preferred form of the present invention, the peak phase detecting section detects a rich side peak phase and a lean side peak phase, and the cylinder-specific air/fuel ratio correcting section calculates deviations of the respective output values of the air/fuel sensor corresponding to the rich side peak phase and the lean side peak phase, and stops the fuel amount correction processing when the deviation becomes equal to or less than a predetermined value.

In a further preferred form of the present invention, the air/fuel ratio detection period setting section comprises a window setting section for setting a window corresponding to each of the cylinders for detection of the peak phases, the window being set variably according to an engine operating state.

In a further preferred form of the present invention, the window setting section sets a first window corresponding to one of the cylinders, and then sets windows corresponding to the remaining cylinders by successively adding to the first window a crank angle difference between the one cylinder and each of the remaining cylinders.

With the above-mentioned respective arrangements, there is obtained an air/fuel ratio control apparatus for an internal combustion engine which can make the air/fuel ratios of the respective cylinders uniform with high accuracy without causing an increased operation load of a CPU, while avoiding the influence of a change in the engine operating state, etc.

The above and other objects, features and advantages of the present invention will become more readily apparent to those skilled in the art from the following detailed description of preferred embodiments of the invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
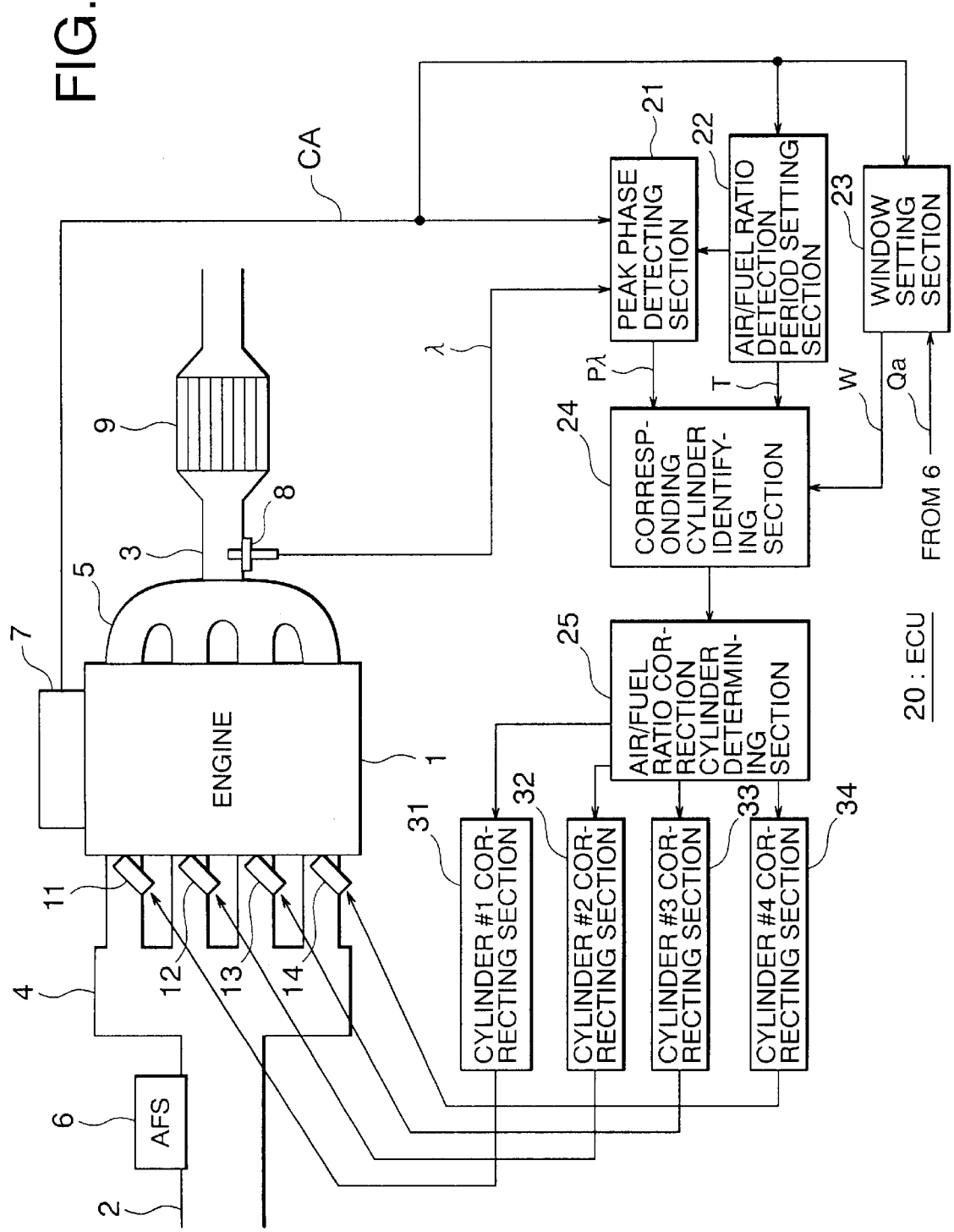
FIG. 1 is a block diagram illustrating the construction of a first embodiment of the present invention.

FIG. 1 illustrates in a block diagram the construction of an air/fule ratio control apparatus for an internal combustion engine according to a first embodiment of the present invention, in which the present invention is applied to a four-cylinder internal combustion engine.

In FIG. 1, an engine 1 representative of an engine proper of an internal combustion engine is provided with an intake pipe 2 and an exhaust pipe 3.

An intake manifold 4 is provided at a connecting portion between the engine 1 and the intake pipe 2 for distributing intake air from the intake pipe 2 to the respective cylinders (#1 through #4) of the engine.

An exhaust manifold 5 is provided at a connecting portion between the engine 1 and the exhaust pipe 3 so that exhaust gases discharged from the respective engine cylinders are merged and collected into the exhaust pipe 3 through the exhaust manifold 5.

An airflow sensor 6 is provided at the upstream side of the intake pipe 2 for detecting the amount of intake air Qa sucked into the engine 1.

A crank angle sensor 7 is mounted on the crankshaft of the engine 1 for generating a crank angle signal CA in synchronization with the rotation of the engine 1.

The crank angle signal CA includes a series of pulses which are indicative of the rotational positions or phases of the respective cylinders, and are used for detecting the crank angle positions or phases of the respective cylinders, the number of revolutions per unit time of the engine, etc.

An air/fuel ratio sensor 8 is mounted on the exhaust pipe 3 in which exhaust gases from the respective cylinders are merged or collected through the exhaust manifold 5. The air/fuel ratio sensor 8 detects an air/fuel ratio of the exhaust gas in the exhaust pipe 3 and generates an output signal representative of a linear air/fuel ratio $\lambda$.

A catalyst 9 is provided at the downstream side of the exhaust pipe 3 for purifying the exhaust gases passing through the exhaust pipe 3.

A plurality (e.g., four in the illustrated example) of fuel injectors 11 through 14 are installed in the intake manifold 4 in correspondence to the plurality of cylinders (#1 through #4), respectively.

The amount of intake air Qa, the crank angle signal CA and the air/fuel ratio $\lambda$ output by the respective sensors 6 through 8 are input to an electronic control unit (ECU) 20 in the form of a microcomputer as information indicative of an engine operating state. As a result, the respective fuel injectors 11 through 14 are driven to operate according to the timing corresponding to the engine operating state under the control of a CPU in the ECU 20.

The ECU 20 includes a peak phase detecting section 21, an air/fuel ratio detection period setting section 22, a window setting section 23, a corresponding cylinder identifying section 24, an air/fuel ratio correction cylinder determining section 25, and a cylinder-specific air/fuel ratio correcting section comprising a cylinder #1 correcting section 31, a cylinder #2 correcting section 32, a cylinder #3 correcting section 33 and a cylinder #4 correcting section 34 for correcting the air/fuel ratios for the cylinders #1 through #4, respectively.

The amount of intake air Qa from the airflow sensor 6 is input to the window setting section 23. The crank angle signal CA from the crank angle sensor 7 is input to the peak phase detecting section 21, the air/fuel ratio detection period setting section 22 and the window setting section 23. The air/fuel ratio $\lambda$ from the air/fuel ratio sensor 8 is input to the peak phase detecting section 21.

The peak phase detecting section 21 detects a peak phase Pλ (i.e., a rich side peak phase or a lean side peak phase) at which the air/fuel ratio becomes a maximum on a rich side or a lean side due to variations in the air/fuel ratio, based on the crank angle signal CA (crank angle phase) and the air/fuel ratio λ (the output value of the air/fuel ratio sensor 8) input thereto for an air/fuel ratio detection period T to be described later.

The air/fuel ratio detection period setting section 22 sets, based on the crank angle signal CA, the air/fuel ratio detection period T corresponding to a total detection cycle for all the cylinders (#1 through #4), and generates an end judgment signal for the air/fuel ratio detection period T.

In case of the engine 1 being a four-stroke engine, the air/fuel ratio detection period T corresponds to two revolutions (720°) of the crankshaft of the engine 1, and includes all the exhaust strokes (i.e., four exhaust strokes) of the respective cylinders.

The window setting section 23 sets, based on the engine operating state (e.g., the amount of intake air Qa, etc.), a window W (i.e., a phase range in which a peak corresponding to each cylinder is expected to appear) for detecting a peak phase of each cylinder. That is, to set a window W, a central crank angle PCA of the window W and a width PCW of the window W are set.

The corresponding cylinder identifying section 24 identifies, based on a peak phase Pλ detected in a window W for each cylinder within the air/fuel ratio detection period T, a cylinder corresponding to the peak phase Pλ (also called a corresponding cylinder).

The air/fuel ratio correction cylinder determining section 25 specifies or determines the corresponding cylinder, which has been identified by the corresponding cylinder identifying section 24 based on the peak phase Pλ, as a cylinder (i.e., a correction target cylinder) for which the air/fuel ratio deviates from those of the remaining cylinders and hence the amount of fuel to be supplied is required to be corrected.

The cylinder #1–#4 correcting sections 31 through 34 constitute the cylinder-specific air/fuel ratio (fuel amount) correcting section of the present invention, and serve to correct the injection time of fuel injectors 11 through 14, respectively, thereby to correct the amount of fuel to be supplied to a cylinder that is the air/fuel ratio correction target.

That is, in order to make the air/fuel ratios of the respective cylinders uniform, the cylinder #1–#4 correcting sections 31 through 34 serve to correct the amount of fuel to be supplied to a cylinder corresponding to an air/fuel ratio correction target in a decreasing direction when the air/fuel ratio correction target cylinder corresponds to a rich side peak phase, whereas they correct the fuel amount in an increasing direction when the air/fuel ratio correction target cylinder corresponds to a lean side peak phase.

Now, the operation of the first embodiment of the present invention wil be described in detail while referring to the flow charts of FIG. 2 through FIG. 5.

Figure 2:
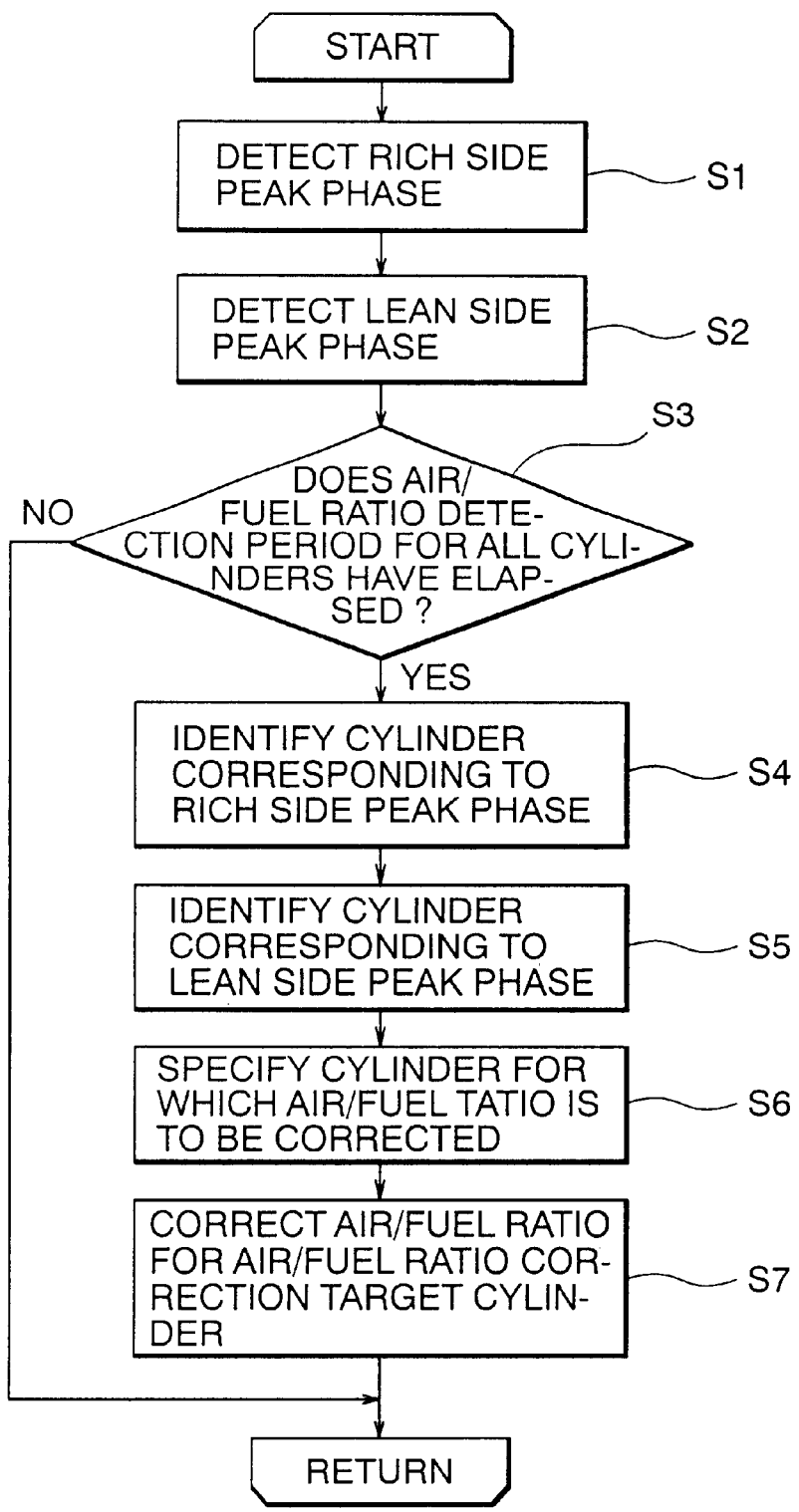
FIG. 2 is a flow chart illustrating a schematic operation according to the first embodiment of the present invention.

FIG. 2 illustrates the entire processing routine which is executed every predetermined period of time.

In FIG. 2, the peak phase detecting section 21 first reads the air/fuel ratio λ, detects peak phases on the rich side and on the lean side (steps S1 and S2), and determines whether or not the air/fuel ratio detection period T has elapsed or terminated which corresponds to a period in which the exhaust strokes for all the cylinders end, i.e., whether the detection of a peak phase Pλ has been executed for the air/fuel ratio detection period T (step S3).

When it is determined in step S3 that the air/fuel ratio detection period T has not yet elapsed (i.e., "NO"), the control process exits the processing routine of FIG. 2, and the detection processing of a peak phase Pλ (steps S1 and S2) is repeated in step S3.

The peak phase detection steps S1 and S2 are always executed during the time when the correction control on the fuel amount is being performed by means of the cylinder-specific air/fuel ratio correcting section (i.e., cylinder #1–#4 correcting sections 31 through 34).

On the other hand, when it is determined in step S3 that the air/fuel ratio detection period T has elapsed (i.e., "YES"), the corresponding cylinder identifying section 24 specifies or identifies the cylinders corresponding to a rich side peak phase and a lean side peak phase, respectively (steps S4 and S5).

Subsequently, the air/fuel ratio correction cylinder determining section 25 determines correction target cylinders for which the air/fuel ratios are to be corrected (step S6), and corresponding ones of the cylinder #1–#4 correcting sections 31 through 34 correct the amounts of fuel to be supplied to the correction target cylinders (step S7). Thereafter, the control process exits the processing routine of FIG. 2.

Figure 3:
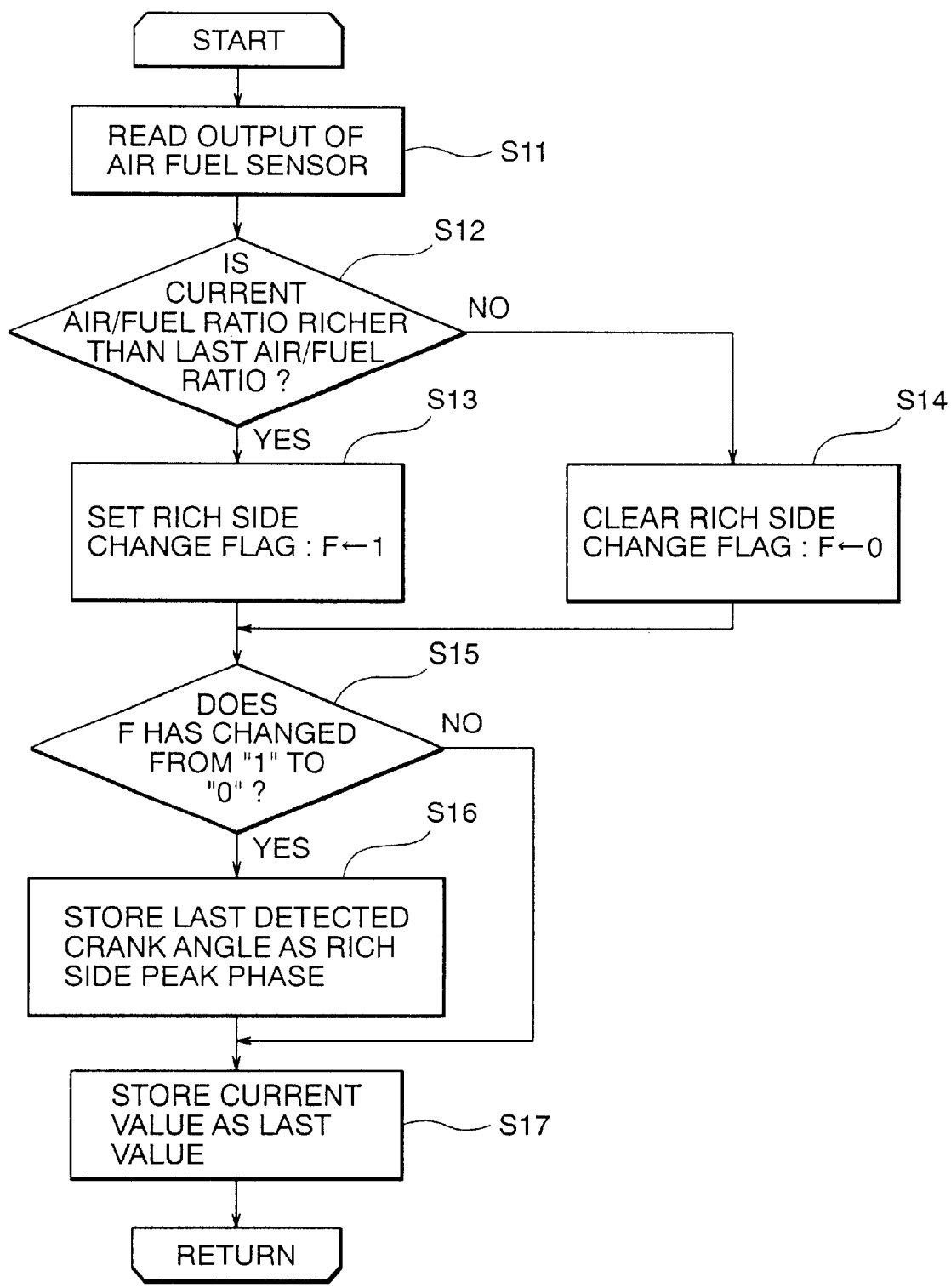
FIG. 3 is a flow chart illustrating a peak phase detection operation according to the first embodiment of the present invention.

FIG. 3 concretely illustrates a processing routine in which the operation of detecting a rich side peak phase (step S1 in FIG. 2) is carried out.

In FIG. 3, the output value (air/fuel ratio A) of the air/fuel ratio sensor 8 is first read in (step S11), and it is determined whether the current value of the air/fuel ratio λ is richer than the last value thereof (step S12).

When it is determined in step S12 that the current value of the air/fuel ratio λ is richer than the last value thereof (i.e., "YES"), a rich side change flag F is set to "1" (step S13), whereas when the current air/fuel ratio value is determined to be not richer than the last value thereof (i.e., "NO"), the rich side change flag F is cleared to "0" (step S14).

Then, in step S15, it is determined whether the change flag F has changed from "1" to "0", and when it is determined that the change flag F has changed from "1" to "0" (i.e., "YES"), the crank angle detected at the last time is stored as a rich side peak phase (step S16), and the current value of the air/fuel ratio λ is updated and stored as the last value (step S17), and the processing routine of FIG. 3 is exited.

On the other hand, when it is determined in step S15 that the change flag F has not changed from "1" to "0" (i.e., "NO"), the processing routine of FIG. 3 is exited without executing the step S16.

Here, note that the details of the operation of detecting a lean side peak phase (step S2 in FIG. 2) are similar to those of FIG. 3. In this case, the term "rich" in the respective steps S12 through S14 and S16 needs only to be replaced by the term "lean", and hence the description thereof is omitted.

Figure 4:
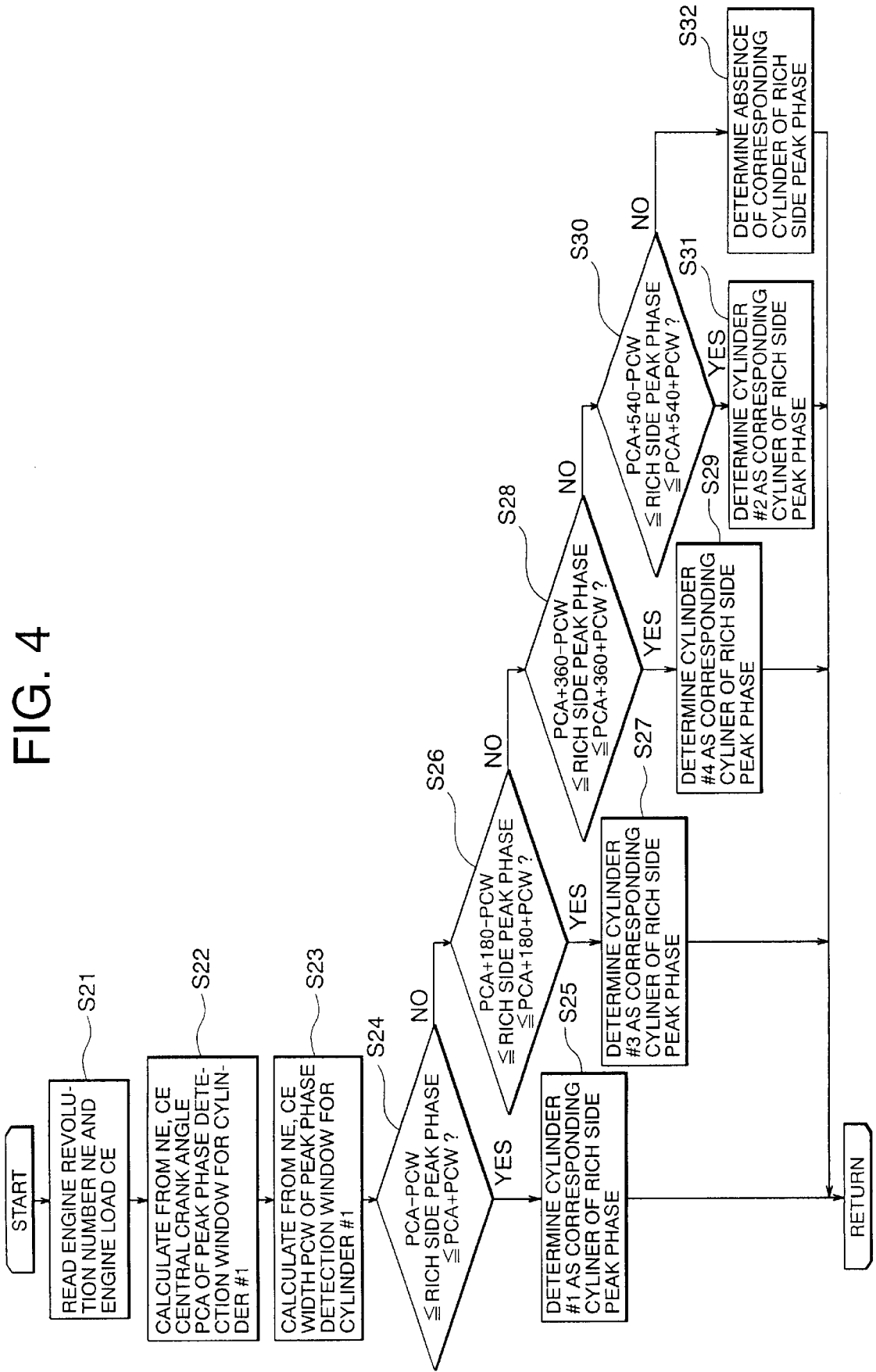
FIG. 4 is a flow chart illustrating a corresponding cylinder identifying operation according to the first embodiment of the present invention.

FIG. 4 concretely illustrates a processing routine according to which a corresponding cylinder identification operation for a rich side peak phase (step S4 in FIG. 2) is carried out.

In FIG. 4, first of all, the corresponding cylinder identifying section 24 reads in the number of revolutions per unit time of the engine Ne (also simply referred to as engine revolution number) and the engine load CE (e.g., charging efficiency, etc.) as the operating state of the engine 1 (step S21).

Subsequently, a central phase (crank angle position) PCA in the window W for peak phase detection corresponding to the cylinder #1 is calculated according to a mapping operation based on the number of revolutions per unit time of the engine Ne and the engine load CE (step S22).

Similarly, the width PCW of the window W for peak phase detection corresponding to the cylinder #1 (i.e., the distance from the central phase) is calculated according to a mapping operation based on the number of revolutions per unit time of the engine Ne and the engine load CE (step S23).

Then, it is determined whether the rich side peak phase detected at this time exists in the window W of the cylinder #1 (step S24), and when it is determined that (PCA−PCW)≦ rich side peak phase≦(PCA+PCW) (i.e., "YES"), the cylinder #1 is determined as a corresponding cylinder of the rich side peak phase (step S25), and the processing routine of FIG. 4 is ended.

Moreover, when it is determined in step S24 that there exists no rich side peak phase in the window W of the cylinder #1 (i.e., "NO"), it is then determined whether there exists a rich side peak phase in a window W for the following cylinder (i.e., cylinder #3) to be controlled (i.e., in a window shifted from the window of the cylinder #1 by a crank angle of 180° added thereto) (step S26).

When it is determined in step S26 that (PCA+180−PCW)≦rich side peak phase≦(PCA+180+PCW) (i.e., "YES"), the cylinder #3 is determined as a corresponding cylinder of the rich side peak phase (step S27).

In addition, when it is determined in step S26 that there exits no rich side peak phase in the window W of the following cylinder #3 (i.e., "NO"), a window W for the cylinder (i.e., cylinder #4) to be controlled subsequent to the cylinder #3 (i.e., a window shifted from the window of the cylinder #1 by a crank angle of 360° added thereto) is set, and similar determination processing is performed for the cylinder #4 (steps S28 and S29).

In the following, similarly, when it is determined in step S28 that no rich side peak phase exists in the window W for the cylinder #4 (i.e., "NO"), a window W for the cylinder (i.e., cylinder #2) to be controlled subsequent to the cylinder #4 (i.e., a window shifted from the window of the cylinder #1 by a crank angle of 540° added thereto) is set, and similar determination processing is performed for the cylinder #2 (steps S30 and S31).

Finally, when it is determined in step S30 that there exists no rich side peak phase in the window W for the cylinder #2 (i.e., "NO"), it is concluded that there is no cylinder corresponding to the rich side peak phase detected at this time (step S32), and the processing routine of FIG. 4 is ended.

In this manner, it is possible to determine to which cylinder a detected rich side peak phase corresponds or whether there is no cylinder corresponding to a detected rich side peak phase.

Here, note that a detailed description is omitted for the operation of identifying a cylinder corresponding to a lean side peak phase (step S5 in FIG. 2), which is the same as the above-described cylinder identifying operation for a rich side peak phase except for replacing the term "rich" by the term "lean" in FIG. 4.

Figure 5:
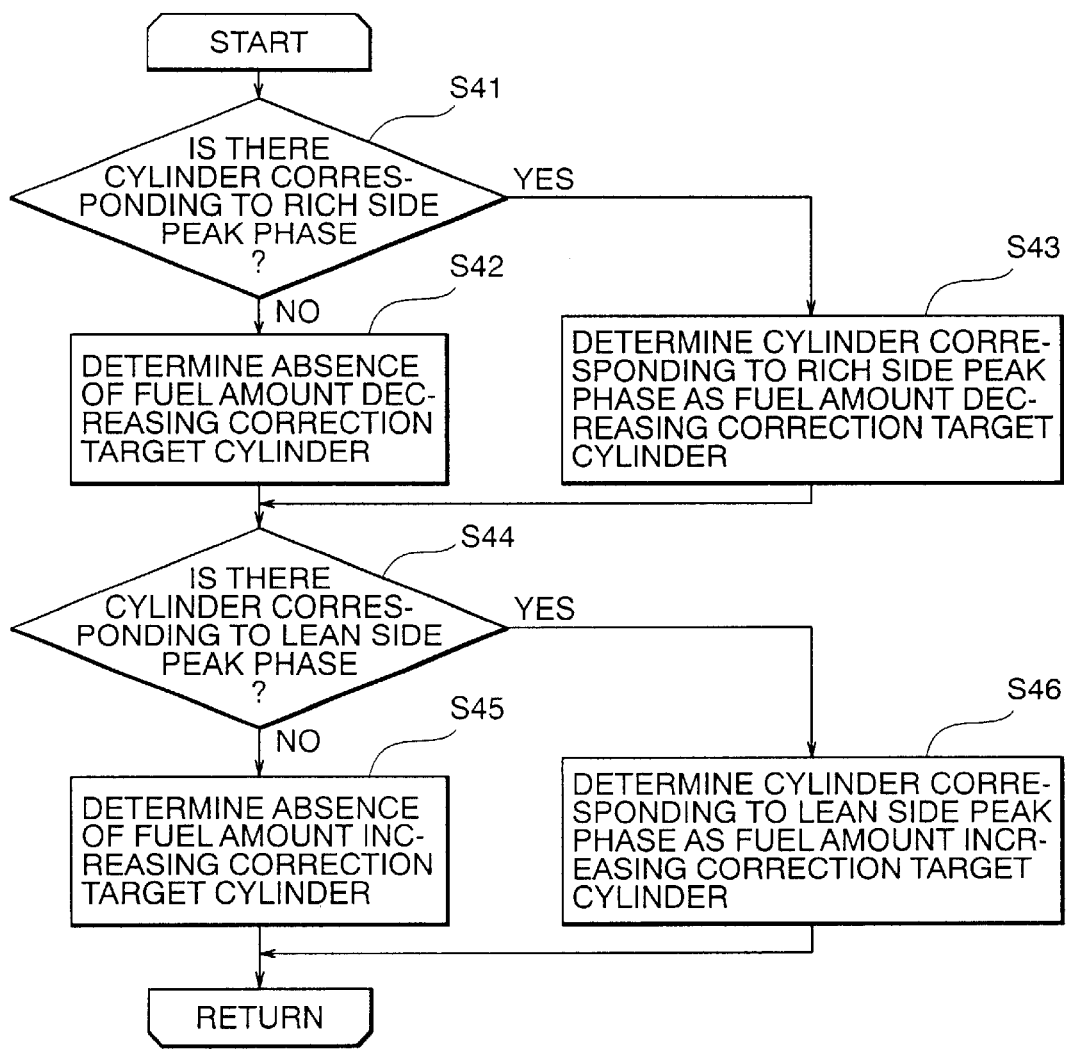
FIG. 5 is a flow chart illustrating a correction target cylinder determining operation according to the first embodiment of the present invention.

FIG. 5 concretely illustrates a processing routine according to which the operation of identifying a correction target cylinder for which the amount of fuel is to be corrected (step S6 in FIG. 2) is carried out.

In FIG. 5, the air/fuel ratio correction cylinder determining section 25 first determines whether there exists a cylinder corresponding to a rich side peak phase (step S41), and when it is determined that there is no corresponding cylinder (i.e., "NO"), the air/fuel ratio correction cylinder determining section 25 determines that there is no correction target cylinder for which the amount of fuel is to be reduced (step S42).

In addition, when it is determined in step S41 that there exists a cylinder corresponding to the rich side peak phase (i.e., "YES"), then in step S43, the corresponding cylinder is determined as a correction target cylinder for which the amount of fuel is to be reduced.

Subsequently, in step S44, it is determined whether there exists a cylinder corresponding to a lean side peak phase, and when it is determined that there is no corresponding cylinder (i.e., "NO"), it is concluded in step S45 that there is no correction target cylinder requiring an increase in the fuel amount.

On the other hand, when it is determined in step S44 that there exists a cylinder corresponding to the lean side peak phase (i.e., "YES"), then in step S46, the corresponding cylinder is determined as a correction target cylinder for which the amount of fuel is to be increased, and the processing routine of FIG. 5 is exited.

Thus, when the results of determinations made by the air/fuel ratio correction cylinder determining section 25 have been obtained, the cylinder correcting sections 31 through 34 drive a corresponding one of the fuel injectors 11 through 14 for a correction target cylinder to correct the amount of fuel to be supplied thereto, thereby controlling the air/fuel ratios of the respective cylinders to a uniform value. Thereafter, a series of processing is ended.

In this manner, it is possible to specify or determine a correction target cylinder for which the air/fuel ratio λ is to be corrected, based on a peak phase Pλ of the air/fuel ratio λ detected for a predetermined period in which the exhaust strokes of the respective cylinders are included, whereby the amount of fuel for the specified cylinder can be properly corrected, thus making it possible to control the air/fuel ratios of the respective cylinders in a uniform way.

As a result, uniform control on the air/fuel ratios of the respective cylinders can be carried out excellently without incurring an increase in the operation load of the CPU 20 while avoiding the influence of changes in the engine operating state, etc.

It should be noted that although having not been particularly described in the above-mentioned operation, the cylinder correcting sections 31 through 34 always calculate deviations of the air/fuel ratio in each cylinder from the stoichiometric air/fuel ratio, corresponding to a rich side peak phase and a lean side peak phase, so that the fuel amount correction processing is stopped when the air/fuel ratio deviations among the respective peaks have been reduced to or below a predetermined value, based on an assumption that the control of making the respective air/fuel ratios uniform is achieved at such a time to a satisfactory extent.

Moreover, the window setting section 23 may be included or incorporated in the air/fuel ratio detection period setting section 22, and a window W corresponding to each cylinder may be set variably according to the engine operating state.

In addition, the window setting section 23 operates to first set a first window corresponding to the cylinder #1, and then successively set the following or subsequent windows corresponding to the remaining cylinders by adding a crank angle phase difference of 180° between the respective cylinders to the first window in a sequential way (see FIG. 4), but instead the windows W for the respective cylinders may be individually set by the use of mapping calculations.

Embodiment 2

Further, although in above-mentioned first embodiment, reference has been made to the case where both a rich side peak phase and a lean side peak phase are detected to decrease and increase the amounts of fuel for corresponding cylinders, respectively, either one of a rich side peak phase and a lean side peak phase alone may be detected so that the amount of fuel for a corresponding cylinder can be corrected either in a decreasing direction or in an increasing direction alone.

Figure 6:
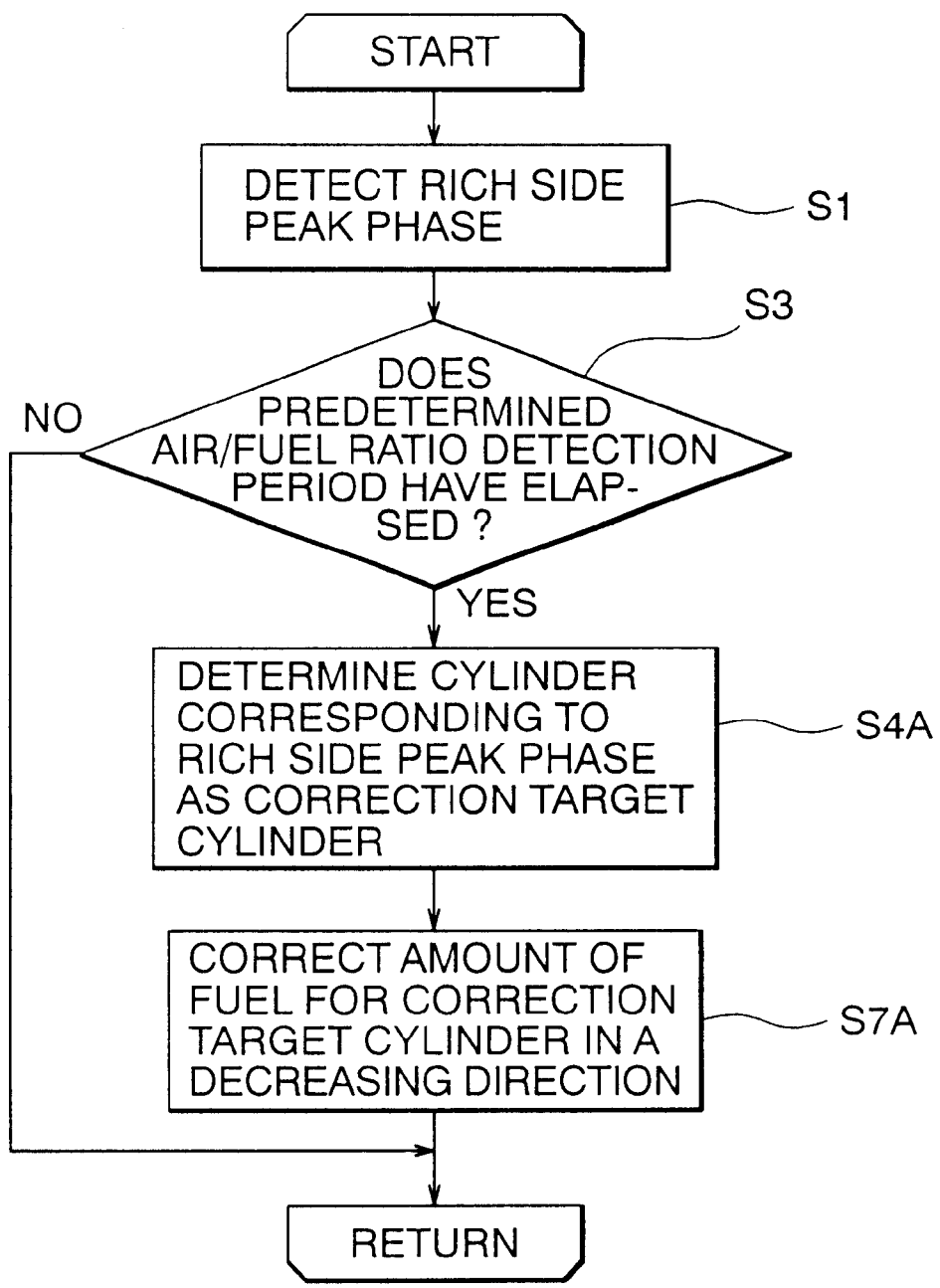
FIG. 6 is a flow chart illustrating a correction target cylinder determining operation according to a second embodiment of the present invention.

FIG. 6 is a flow chart illustrating the operation of a second embodiment of the present invention, in which the amount of fuel is corrected to decrease only for a cylinder corresponding to a rich side peak phase.

In FIG. 6, steps S4A and S7A correspond to the above-mentioned steps S4 and S7 of FIG. 2, respectively, and steps S1 and S3 are the same processing as referred to in the first embodiment with reference to FIG. 2.

In this case, the peak phase detecting section 21 detects only a rich side peak phase (step SI), and the air/fuel ratio correction cylinder determining section 25 determines a cylinder corresponding to the rich side peak phase as a correction target cylinder (step S4A) at the instant when an air/fuel ratio detection period T has elapsed (step S3), so that it decreases the amount of fuel supplied to the correction target cylinder through the action of the respective cylinder correcting sections 31 through 34 (step S7A).

As shown in FIG. 6, the air/fuel ratios in the respective cylinders can be made uniform through the repeated execution of corrections of reducing the amount of fuel to be supplied to one cylinder which represents a rich side maximum air/fuel ratio, thus providing substantially the same effects or advantages as referred to above in the first embodiment.

In this case, only one cylinder is assumed to be a correction target, so an increase in the CPU load can be suppressed to a minimum.

Here, it is to be noted that only one cylinder corresponding to a rich side peak phase is made as an air/fuel ratio correction target, but on the contrary, assuming that the air/fuel ratio of a single cylinder alone deviates to a lean side, the amount of fuel even for one cylinder representing a maximum air/fuel ratio on the lean side may be corrected to increase, whereby the air/fuel ratios of the respective cylinders can be similarly controlled uniformly.

Embodiment 3

Although in above-mentioned first and second embodiments, a correction target cylinder is determined based on one cylinder corresponding to a peak phase on the rich side or on the lean side, such a correction target cylinder can be determined on the basis of two cylinders corresponding to peak phases on the rich side and on the lean side, respectively.

Figure 7:
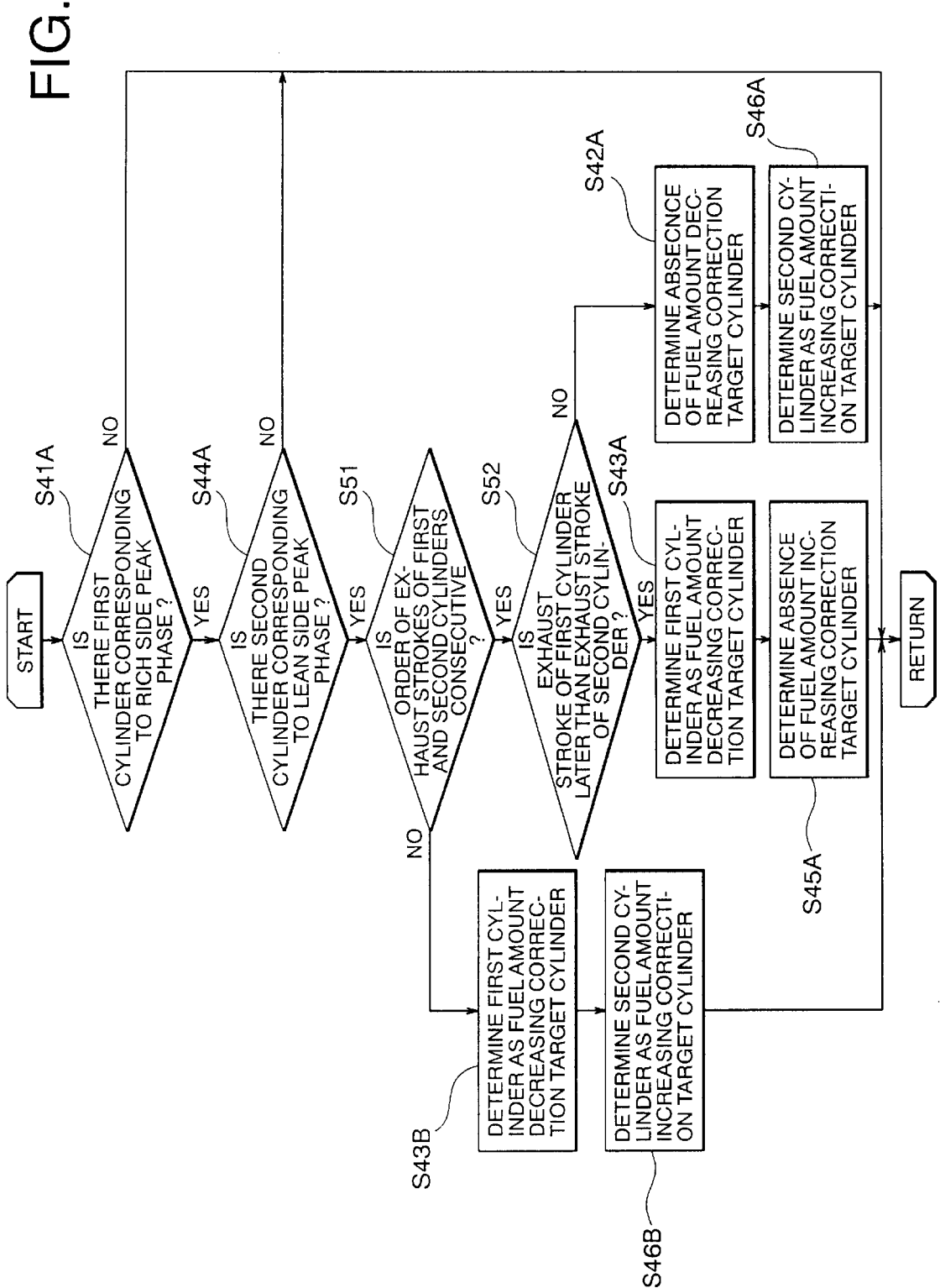
FIG. 7 is a flow chart illustrating a correction target cylinder determining operation according to a third embodiment of the present invention.

FIG. 7 is a flow chart illustrating the operation of a third embodiment of the present invention, in which a correction target cylinder is determined based on whether the order of the exhaust strokes of two cylinders corresponding to the peak phases on the rich side and the lean side is consecutive.

In FIG. 7, steps S41A through S46A, S43B and S46B are the same processing as the above-mentioned steps S41-S46, S43 and S46, respectively, of FIG. 5.

In this case, the corresponding cylinder identifying section 24 determines whether there exist both a first cylinder and a second cylinder corresponding to a rich side peak phase and a lean side peak phase, respectively (steps S41A and S44A), and when it is determined that at least one of the first and second cylinders does not exist (i.e., "NO"), the processing routine of FIG. 7 is exited.

On the other hand, when it is determined in steps S41A and S44A that there exist the first and second cylinders (i.e., "YES"), the air/fuel ratio correction cylinder determining section 25 subsequently determines whether the order of the exhaust strokes of the first and second cylinders is consecutive (step S51).

When it is determined in step S51 that the order of the exhaust strokes of the first and second cylinders is consecutive (i.e., "YES"), then in step S52, it is determined whether the exhaust stroke of the first cylinder is later than that of the second cylinder.

When it is determined in step S52 that the exhaust stroke of the first cylinder is later than that of the second cylinder (i.e., "YES"), the first cylinder is determined as a correction target cylinder requiring a decrease in the fuel amount (step S43A), and it is also determined that there is no correction target cylinder requiring an increase in the fuel amount (step S45A). Thereafter, the processing routine of FIG. 7 is exited.

When it is determined in step S52 that the exhaust stroke of the second cylinder is later than that of the first cylinder (i.e., "NO"), it is determined that there exists no correction target cylinder requiring a decrease in the fuel amount (step S42A), and the second cylinder is determined as a correction target cylinder requiring an increase in the fuel amount (step S46A). After that, the processing routine of FIG. 7 is exited.

On the other hand, when it is determined in step S51 that the order of the exhaust strokes of the first and second cylinders is not consecutive (i.e., "NO"), the first cylinder is determined as a correction target cylinder requiring a decrease in the fuel amount (step S43B), and the second cylinder is determined as a correction target cylinder requiring an increase in the fuel amount (step S46B). Thereafter, the processing routine of FIG. 7 is exited.

Thus, when the first cylinder corresponding to a rich side peak phase and the second cylinder corresponding to a lean side peak phase are determined, and when the order of the respective exhaust strokes of the first and second cylinders is consecutive, the air/fuel ratio correction cylinder determining section 25 specifies only the one of the first and second cylinders of which the exhaust stroke is later than that of the other as an air/fuel ratio correction target cylinder.

In addition, when it is determined that the order of the exhaust strokes of the first and second cylinders is not consecutive, the air/fuel ratio correction cylinder determining section 25 specifies the first and second cylinders as air/fuel ratio correction target cylinders of which the air/fuel ratios deviate to the rich side and to the lean side, respectively, and the cylinder correcting sections 31 through 34 correct the amounts of fuel for the first and second cylinders at the same time.

As a result, this embodiment of the present invention is hardly subject to the influence of changes in the operating state of the engine 1, etc., and the air/fuel ratios of the respective cylinders can be made uniform more accurately.

Now, the air/fuel ratio control operation according to the third embodiment of the present invention will be described more specifically while referring to FIG. 8 through FIG. 11.

Figure 8:
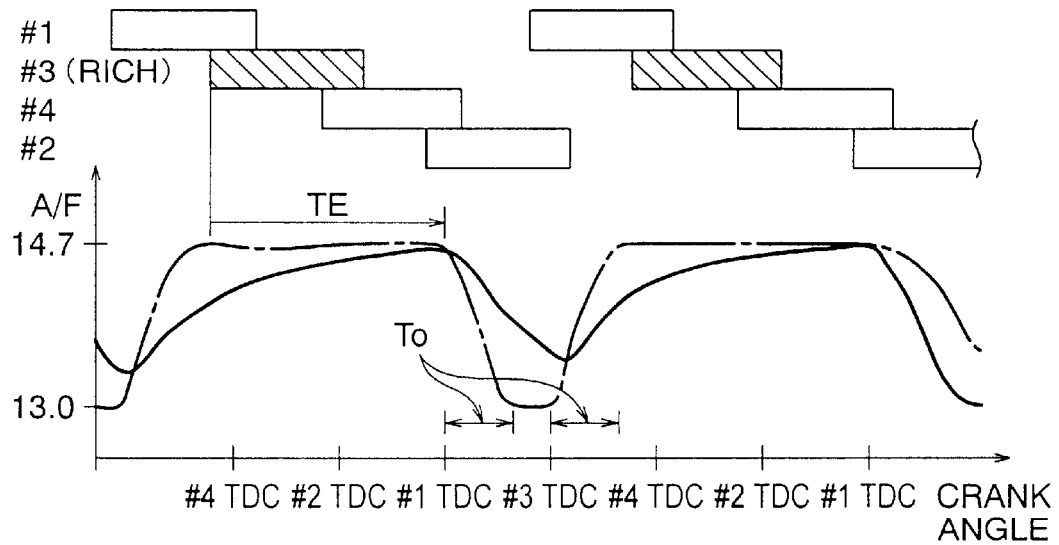
FIG. 8 is an explanatory view diagrammatically illustrating the principle of detection of a peak phase in the correction target cylinder determining operation according to the third embodiment of the present invention.

FIG. 8 is an explanatory view diagrammatically illustrating the principle of detection of a peak phase, in which the abscissa indicates the reference crank angle positions (TDC) corresponding to respective cylinders and the ordinate indicates a change in the actual air/fuel ratio A/F ($\lambda$) and a change in the detection value of the air/fuel ratio sensor 8.

That is, a curve denoted by an alternate long and short dash line in FIG. 8 represents the change in the actual air/fuel ratio in the exhaust pipe 3, and the curve denoted by a solid line represents the change in the output value of the air/fuel ratio sensor 8.

Also, blocks illustrated in the upper parts of respective air/fuel ratio waveforms represent the timings or durations of the exhaust strokes (exhaust valve opening timings or durations) of respective cylinders (#1, #3, #4, #2), and the respective exhaust strokes of the cylinders mutually overlap partially with those of the cylinders being successively controlled.

A period including one exhaust stroke for each of the four cylinders illustrated in FIG. 8 represents the above-mentioned air/fuel ratio detection period T.

In addition, hatched blocks (in this example, cylinder #3) represent a cylinder of which the air/fuel ratio (e.g., A/F ratio=13.0) deviates to a rich side as compared with the air/fuel ratio (e.g., A/F ratio=14.7) of the remaining cylinders.

A rich side peak phase (see the alternate long and short dash line) resulting from the cylinder #3 appears after a delay time TE corresponding to the moving or travelling time of exhaust gases has elapsed from the starting time point of every exhaust stroke of the cylinder #3.

Moreover, a pair of changing times To interfering with each other appear before and after each peak phase due to the influences of the overlap control of the exhaust strokes, the shape of the exhaust pipe 3, etc.

In addition, the output value of the air/fuel ratio sensor 8 changes, as indicated at a sold line, owing to its response delay and the like in addition to the above-mentioned influence of interference.

Figure 9:
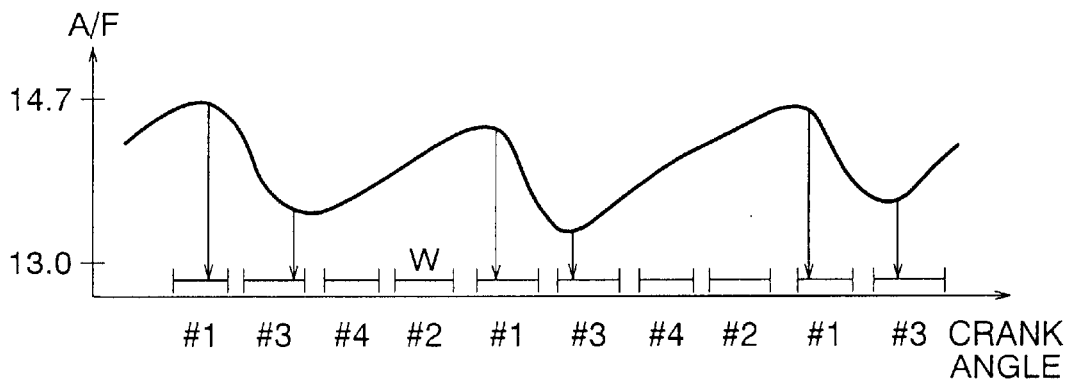
FIG. 9 is an explanatory view illustrating peak phases detected in the output value of an air/fuel ratio sensor in the case where the order of the exhaust strokes of two cylinders corresponding the respective peak phases is consecutive.

FIG. 9 is an explanatory view illustrating peak phases detected in the output value of the air/fuel ratio sensor 8 in the case where the order of the exhaust strokes of two cylinders corresponding the respective peak phases is consecutive (corresponding to the steps S51, S52, S43A and S45A in FIG. 7) with arrows indicating the detected peak phases.

Figure 14:
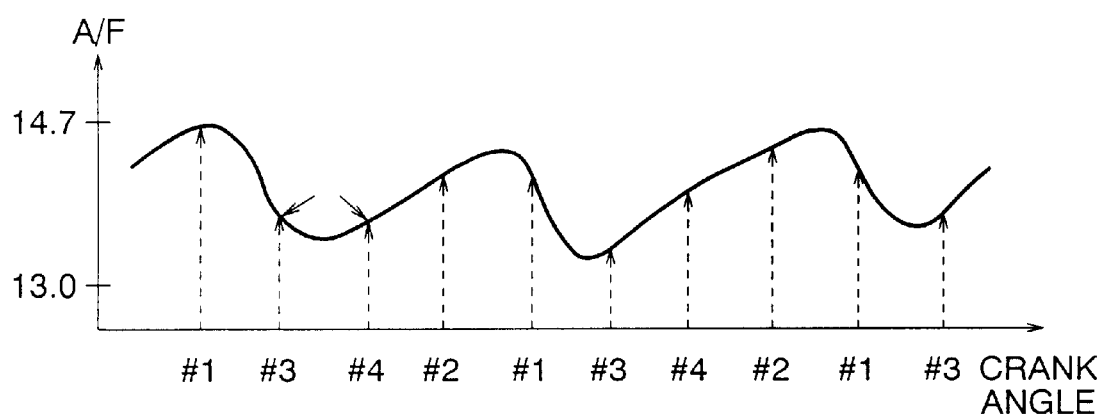
FIG. 14 is an explanatory view illustrating a correction target cylinder determining operation according to a conventional air/fuel ratio control apparatus for an internal combustion engine.

In FIG. 9, a plurality of windows W are set corresponding to the respective cylinders, so that it is determined whether each detected peak phase is included in a corresponding window W. Accordingly, it is possible to prevent the air/fuel ratios of the respective cylinders from being mis-detected as in the aforementioned conventional apparatus (see FIG. 14).

That is, a phase corresponding to the crank angle when a peak on the rich side is detected is stored as a rich side peak phase, and it is determined whether this peak phase is included in a window W corresponding to each cylinder, as a result of which a cylinder corresponding to the peak phase is specified.

In this case, the cylinder #1 is specified for a corresponding cylinder of the lean side peak phase, and the cylinder #3 following the cylinder #1 is specified for a corresponding cylinder of the rich side peak phase.

Therefore, only the cylinder #3 with its exhaust stroke being located just after the exhaust stroke of the cylinder #1 becomes a correction target cylinder, and the amount of fuel to be supplied to the cylinder #3 is corrected to decrease.

Figure 10:
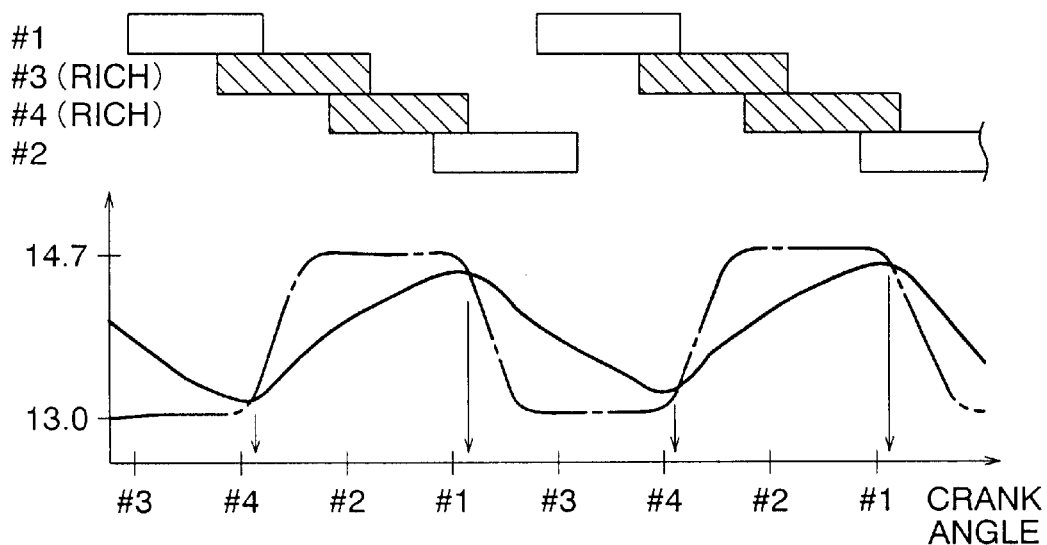
FIG. 10 is an explanatory view illustrating the correction target cylinder determining operation according to the third embodiment of the present invention in the case where the order of the exhaust strokes of two cylinders corresponding to respective peak phases is not consecutive with a certain state of air/fuel ratios.
Figure 11:
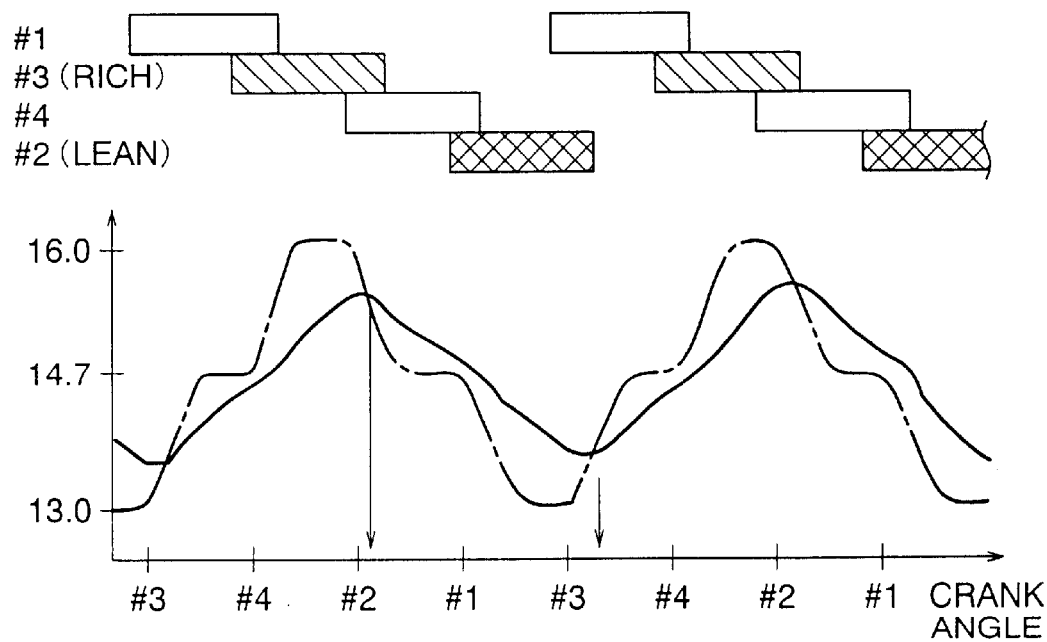
FIG. 11 is an explanatory view illustrating the correction target cylinder determining operation according to the third embodiment of the present invention in the case where the order of the exhaust strokes of two cylinders corresponding to respective peak phases is not consecutive with another state of air/fuel ratios.

FIG. 10 and FIG. 11 illustrate the operation in the case where the order of the exhaust strokes of two cylinders corresponding to respective peak phases is not consecutive (corresponding to the steps S51, S43B and S46B in FIG. 7).

FIG. 10 illustrates the case where the air/fuel ratios of the cylinder #3 and the cylinder #4 deviate to the rich side, and FIG. 11 illustrates the case where the air/fuel ratio of the cylinder #3 deviates to the rich side and the air/fuel ratio of the cylinder #2 (see cross-hatched portions) deviates to the lean side.

In FIG. 10, the cylinder #1 is specified for a corresponding cylinder of the lean side peak phase, and the cylinder #4 with its exhaust stroke being two times later than the exhaust stroke of the cylinder #1 is specified for a corresponding cylinder of the rich side peak phase.

Consequently, the amount of fuel to be supplied to the cylinder #1 is corrected to increase, and the amount of fuel to be supplied to the cylinder #4 is corrected to decrease.

Further, in FIG. 11, the cylinder #2 is specified for a corresponding cylinder of the lean side peak phase, and the cylinder #3 with its exhaust stroke being two times later than the exhaust stroke of the cylinder #2 is specified for a corresponding cylinder of the rich side peak phase.

Thus, the amount of fuel to be supplied to the cylinder #2 is corrected to increase, and the amount of fuel to be supplied to the cylinder #3 is corrected to decrease.

Embodiment 4

Although in the above-described third embodiment, one cylinder or two cylinders has been specified as a correction target cylinder(s) on the basis of the order of the exhaust strokes of the respective cylinders corresponding to the peak phases on the rich side and on the lean side, a plurality of correction target cylinders may be specified as correction target cylinders.

Figure 12:
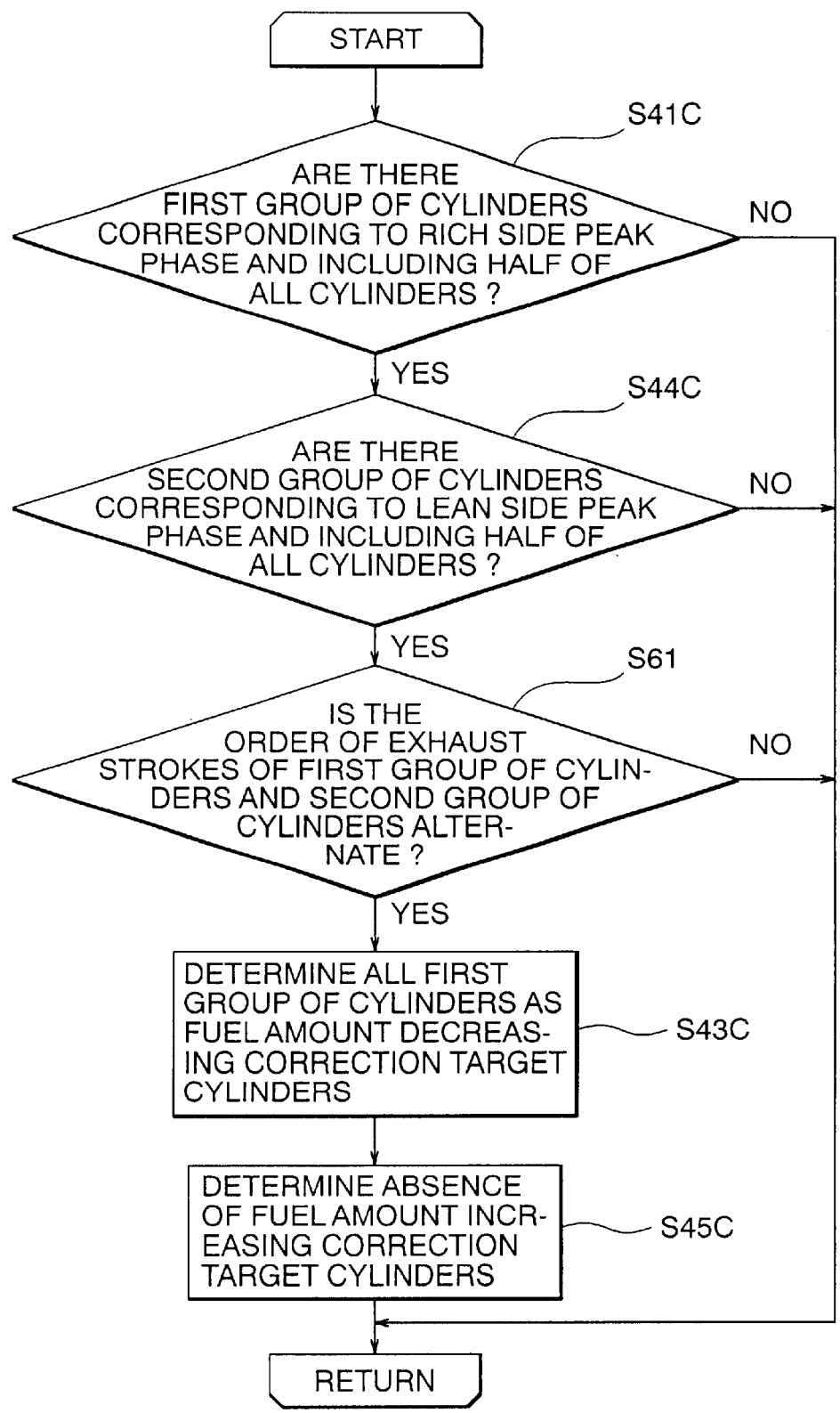
FIG. 12 is a flow chart illustrating a correction target cylinder determining operation according to a fourth embodiment of the present invention.

FIG. 12 is a flow chart illustrating the operation of a fourth embodiment of the present invention, in which correction target cylinders are determined based on whether the order of the exhaust strokes of two groups of cylinders corresponding to peak phases on the rich side and on the lean side is arranged in an alternate fashion.

In FIG. 7, steps S41C and S43C through S45C are the same processing as the above-mentioned steps S41 and S43 through S45, respectively, of FIG. 5.

In this case, the corresponding cylinder identifying section 24 determines whether the first and second cylinder groups corresponding to the rich side peak phase and the lean side peak phase, respectively, exist with a half of the total number of all the cylinders (steps S41C and S44C), and when it is determined that at least one of the two groups does not exist with a half of the total number (i.e., "NO"), the processing routine of FIG. 12 is exited.

Moreover, when it is determined in steps S41C and S44C that there are a first cylinder group and a second cylinder group each including a half of the total number of all the cylinders (i.e., "YES"), then in step S61, the air/fuel ratio correction cylinder determining section 25 determines whether the order of the exhaust strokes of the first and second cylinder groups is alternate.

When it is determined in step S61 that the order of the exhaust strokes of the first and second cylinder groups each including a half of the total number of all the cylinders is alternate (i.e., "YES"), the first group of cylinders are all determined as correction target cylinders requiring a decrease in the fuel amount (step S43C), and it is also determined that there exist no correction target cylinders requiring an increase in the fuel amount (step S45C). Thereafter, the processing routine of FIG. 12 is exited.

On the other hand, when it is determined in step S61 that the order of the exhaust strokes of the first and second cylinder groups is not alternate (i.e., "NO"), the processing routine of FIG. 12 is exited at once without executing the steps S43C and S45C.

Here, it is to be noted that although the air/fuel ratio correction cylinder determining section 25 determines only the first cylinder group corresponding to rich side peak phases as correction target cylinders, it may instead determines the second cylinder group corresponding to lean side peak phases as air/fuel ratio correction target cylinders.

In this manner, the amounts of fuel for all the cylinders corresponding to peak phases either on the rich side or on the lean side can be corrected at the same time.

Now, specific reference will be made to the air/fuel ratio control operation according to the fourth embodiment of the present invention while referring to FIG. 13.

Figure 13:
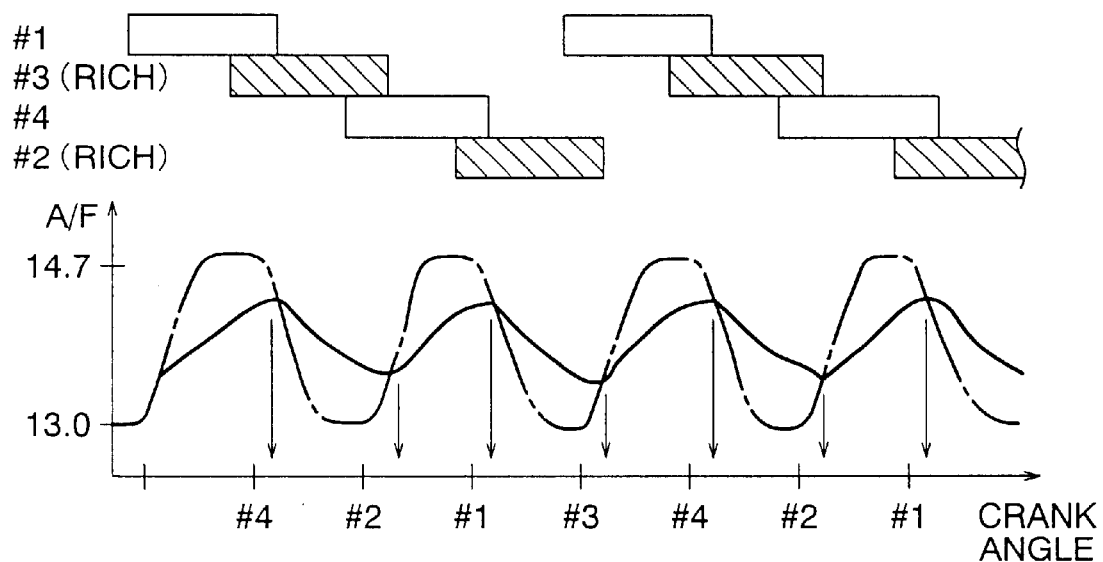
FIG. 13 is an explanatory view illustrating the correction target cylinder determining operation according to the fourth embodiment of the present invention.

FIG. 13 illustrates the case where the air/fuel ratios of the cylinder #3 and the cylinder #2 deviate to the rich side. In this case, peak phases correspond to the phases at which the detection value of the air/fuel ratio becomes a maximum or a minimum for the air/fuel ratio detection period T.

In FIG. 13, the cylinder #4 and the cylinder #1 are specified for the corresponding cylinders of the lean side peak phases, and the cylinder #2 and the cylinder #3 are specified for the corresponding cylinders of the rich side peak phases.

Consequently, in the air/fuel ratio detection period T, the cylinders corresponding to the respective peak phases on the rich side and on the lean side are alternately specified with a half of all the cylinders, so that the amounts of fuel for the first cylinder group (e.g., cylinder #2 and cylinder #3) corresponding to the rich side peak phases are corrected to decrease, and at the same time, the amounts of fuel for the second cylinder group (e.g., cylinder #4 and cylinder #1) corresponding to the lean side peak phases are also corrected to increase.

Thus, the air/fuel ratios of the respective cylinders can be made uniform more promptly while providing substantially the same effects as referred to above.

It goes without saying that any of the above-mentioned respective first through fourth embodiments can be arbitrarily combined with each other to provide better synergistic effects.

While the invention has been described in terms of several preferred embodiments, those skilled in the art will recognize that the invention can be practiced with modification within the spirit and scope of the appended claims.

What is claimed is:

1. An air/fuel ratio control apparatus for an internal combustion engine, said apparatus comprising:

fuel injectors respectively provided on a plurality of cylinders;

an air/fuel ratio sensor disposed at a collective portion of an exhaust system at which exhaust gases from the respective cylinders are collected;

a crank angle sensor for detecting a crank angle phase of each of said cylinders;

an air/fuel ratio detection period setting section for setting an air/fuel ratio detection period in which an exhaust stroke of each cylinder is included;

a peak phase detecting section for taking in an output of said air/fuel ratio sensor during said air/fuel ratio detection period and detecting peak phases which become a maximum on a rich side or on a lean side due to variations in the air/fuel ratio;

an air/fuel ratio correction cylinder determining section for specifying, based on said peak phases, an air/fuel ratio correction target cylinder for which an air/fuel ratio is to be corrected; and a cylinder-specific air/fuel ratio correcting section for correcting an amount of fuel to be supplied to said air/fuel ratio correction target cylinder;

wherein the amounts of fuel to be supplied to said respective cylinders are made uniform by means of said cylinder-specific air/fuel ratio correcting section.

2. The air/fuel ratio control apparatus for an internal combustion engine according to claim 1, wherein said cylinder-specific air/fuel ratio correcting section corrects an amount of fuel to be supplied to said air/fuel ratio correction target cylinder in a decreasing direction when said air/fuel ratio correction target cylinder corresponds to a rich side peak phase, but in an increasing direction when said air/fuel ratio correction target cylinder corresponds to a lean side peak phase.

3. The air/fuel ratio control apparatus for an internal combustion engine according to claim 1, wherein said peak phase detecting section detects a rich side peak phase alone, and said air/fuel ratio correction cylinder determining section specifies, based on said rich side peak phase, only that cylinder for which an output value of said air/fuel ratio sensor is assumed to deviate from those for the remaining cylinders, as said air/fuel ratio correction target cylinder.

4. The air/fuel ratio control apparatus for an internal combustion engine according to claim 1, wherein said peak phase detecting section detects a lean side peak phase alone, and said air/fuel ratio correction cylinder determining section specifies, based on said lean side peak phase, only that cylinder for which an output value of said air/fuel ratio sensor is assumed to deviate from those for the remaining cylinders, as said air/fuel ratio correction target cylinder.

5. The air/fuel ratio control apparatus for an internal combustion engine according to claim 1, wherein said peak phase detecting section detects a rich side peak phase and a lean side peak phase, and when it is determined that a first cylinder and a second cylinder correspond to said rich side peak phase and said lean side peak phase, respectively, and when the order of respective exhaust strokes of said first and second cylinders is consecutive, said air/fuel ratio correction cylinder determining section specifies only one of said first and second cylinders, of which the exhaust stroke is later than that of the other cylinder, as said air/fuel ratio correction target cylinder.

6. The air/fuel ratio control apparatus for an internal combustion engine according to claim 1, wherein said peak phase detecting section detects a rich side peak phase and a lean side peak phase, and when it is determined that a first cylinder and a second cylinder correspond to said rich side peak phase and said lean side peak phase, respectively, and when the order of respective exhaust strokes of said first and second cylinders is not consecutive, said air/fuel ratio correction cylinder determining section specifies said first and second cylinders as said air/fuel ratio correction target cylinders, for which the air/fuel ratios deviate to the rich side and the lean side, respectively.

7. The air/fuel ratio control apparatus for an internal combustion engine according to claim 1, wherein said peak phase detecting section detects a rich side peak phase and a lean side peak phase, and when it is determined that a first group of cylinders and a second group of cylinders correspond to said rich side peak phase and said lean side peak phase, respectively, and when said first group of cylinders including one half of a total number of all said cylinders and said second group of cylinders including the other half of all said cylinders are detected alternately, said air/fuel ratio correction cylinder determining section specifies either one of said first and second groups of cylinders as said air/fuel ratio correction target cylinders.

8. The air/fuel ratio control apparatus for an internal combustion engine according to claim 1, wherein said peak phase detecting section detects a rich side peak phase and a lean side peak phase, and said cylinder-specific air/fuel ratio correcting section calculates deviations of the respective output values of said air/fuel ratio sensor corresponding to said rich side peak phase and said lean side peak phase, and stops said fuel amount correction processing when said deviation becomes equal to or less than a predetermined value.

9. The air/fuel ratio control apparatus for an internal combustion engine according to claim 1, wherein said air/fuel ratio correction cylinder determining section comprises a window setting section for setting a window for discriminating which cylinder corresponds to said peak phases, said window being set variably according to an engine operating state.

10. The air/fuel ratio control apparatus for an internal combustion engine according to claim 9, wherein said window setting section sets a first window corresponding to one of said cylinders, and then sets windows corresponding to the remaining cylinders by successively adding to said first window a crank angle difference between said one cylinder and each of said remaining cylinders.

* * * * *